(12) United States Patent
Jian

(10) Patent No.: US 12,335,914 B2
(45) Date of Patent: Jun. 17, 2025

(54) TERMINAL DEFAULT PAGING DRX SETUP METHOD AND APPARATUS, AND ELECTRONIC DEVICE AND STORAGE MEDIUM

(71) Applicant: ZTE CORPORATION, Shenzhen (CN)

(72) Inventor: Dongrui Jian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 398 days.

(21) Appl. No.: 17/904,649

(22) PCT Filed: Nov. 26, 2020

(86) PCT No.: PCT/CN2020/131709
§ 371 (c)(1),
(2) Date: Aug. 19, 2022

(87) PCT Pub. No.: WO2021/179686
PCT Pub. Date: Sep. 16, 2021

(65) Prior Publication Data
US 2023/0102642 A1    Mar. 30, 2023

(30) Foreign Application Priority Data
Mar. 11, 2020    (CN) .......................... 202010167511.8

(51) Int. Cl.
*H04W 68/02*    (2009.01)
*H04W 72/12*    (2023.01)
*H04W 76/28*    (2018.01)

(52) U.S. Cl.
CPC ........... *H04W 68/02* (2013.01); *H04W 72/12* (2013.01); *H04W 76/28* (2018.02)

(58) Field of Classification Search
CPC ..... H04W 68/02; H04W 72/12; H04W 76/28; H04W 52/0216; H04W 52/028;
(Continued)

(56) References Cited

U.S. PATENT DOCUMENTS

| 10,602,480 B2 | 3/2020 | Li et al. |
| 2015/0109995 A1* | 4/2015 | Mathai ................ H04L 12/4641 370/328 |

(Continued)

FOREIGN PATENT DOCUMENTS

| CN | 102281502 A | 12/2011 |
| CN | 108990149 A | 12/2018 |

(Continued)

OTHER PUBLICATIONS

3GPP Technical Specification Group Radio Access Network. "Consideration on NB-IoT DRX eDRX cycle and PTW," 3GPP TSG-RAN3 Meeting #92, May 2016, pp. 1-6.

(Continued)

*Primary Examiner* — Mazda Sabouri
(74) *Attorney, Agent, or Firm* — Vivacqua Crane, PLLC

(57) ABSTRACT

Disclosed are a terminal default paging DRX setup method and apparatus, and an electronic device and a non-transitory computer-readable storage medium. The method may include: determining a terminal setup policy for terminal Default Paging DRX; determining a value of Default Paging DRX in an S1 Setup Request message and/or an S1 Configuration Update message according to the terminal setup policy; and determining, by a base station, a paging time of a terminal type according to a Paging DRX parameter in S1 Paging message received from a core network. The Paging DRX parameter is carried in the S1 Paging message to the base station when the core network initiates paging. The (Continued)

Paging DRX parameter is set according to the Default Paging DRX and a value of UE-specific paging DRX.

9 Claims, 6 Drawing Sheets

(58) Field of Classification Search
CPC ... H04W 4/70; H04W 52/0248; H04W 68/00; Y02D 30/70
See application file for complete search history.

(56) References Cited

U.S. PATENT DOCUMENTS

| | | | |
|---|---|---|---|
| 2016/0057701 A1* | 2/2016 | Choi | H04W 52/0216 370/311 |
| 2017/0280481 A1* | 9/2017 | Stern-Berkowitz | H04L 1/1854 |
| 2022/0078872 A1* | 3/2022 | Shrestha | H04W 76/30 |

FOREIGN PATENT DOCUMENTS

| | | |
|---|---|---|
| CN | 109644427 A | 4/2019 |
| CN | 110351815 A | 10/2019 |
| WO | 2019063819 A1 | 4/2019 |
| WO | 2020032849 A1 | 2/2020 |

OTHER PUBLICATIONS

3GPP Technical Specification Group Radio Access Network. "Consideration on UE specific DRX in EPS and 5GS," 3GPP TSG-RAN WG3 Meeting #107-e, Mar. 2020, pp. 1-5.

3GPP Technical Specification Group Radio Access Network. "Introduction of UE specific DRX for NB-IoT," 3GPP TSG RAN Meeting #85, Sep. 2019, pp. 1-4.

3GPP Technical Specification Group Radio Access Network. "Introduction of UE specific DRX for NB-IoT," 3GPP TSG-RAN WG2 Meeting #107bis, Oct. 2019, pp. 1-4.

3GPP Technical Specification Group Radio Access Network. "Introduction of UE specific DRX for NB-IoT," 3GPP TSG-RAN WG2 Meeting #109e, Mar. 2020, pp. 1-6.

3GPP Technical Specification Group Radio Access Network. "NB-IoT UE specific DRX—Backward Compatibility," 3GPP TSG-RAN WG2 NR Meeting #108, Nov. 2019, pp. 1-3.

International Searching Authority. International Search Report and Written Opinion for PCT Application No. PCT/CN2020/131709 and English translation, mailed Mar. 2, 2021, pp. 1-12.

The State Intellectual Property Office of People's Republic of China. First Office Action and Search Report for CN Application No. 202010167511.8 and English translation, mailed Apr. 22, 2025, pp. 1-20.

* cited by examiner

TERMINAL DEFAULT PAGING DRX SETUP METHOD AND APPARATUS, AND ELECTRONIC DEVICE AND STORAGE MEDIUM

CROSS-REFERENCE TO RELATED APPLICATION

This application is a national stage filing under 35 U.S.C. § 371 of international application number PCT/CN2020/131709, filed Nov. 26, 2020, which claims priority to Chinese patent application No. 202010167511.8, filed on Mar. 11, 2020. The contents of these applications are incorporated herein by reference in their entirety.

TECHNICAL FIELD

The present disclosure relates to the field of mobile communications, and in particular to a terminal default paging DRX setup method and apparatus, an electronic device, and a non-transitory computer-readable storage medium.

BACKGROUND

Currently, in the existing 3GPP 36.413 protocol, an S1 Setup Request message or S1 Configuration Update message sent by a base station eNB to an MME in the core network includes only one Default Paging DRX field to represent default paging DRX (discontinuous reception) of the base station.

In a Long Term Evolution (LTE) system where an LTE terminal and an Enhanced Machine Type Communication (eMTC) terminal coexist, the LTE terminal and the eMTC terminal which have quite different characteristics have different requirements for paging DRX. The eMTC terminal may require longer or shorter paging DRX than the LTE terminal. However, only one default paging DRX can be delivered in an existing S1 paging message, which leads to a default paging DRX conflict in the case of coexistence of an LTE terminal and an eMTC terminal on a base station, failing to meet different power saving requirements of the LTE terminal and the eMTC terminal.

Although this problem can be partly solved by the introduction of eDRX in existing protocols, not all eMTC terminals support the eDRX function, and the eDRX function is disabled by default in some base stations. When some eMTC terminals do not support the eDRX function or the eDRX function is disabled by default in the base station, the eDRX function cannot be used.

In the case where the eDRX function cannot be used, there is a need for a mechanism which not only can set respective default paging DRX for the LTE terminal and the eMTC terminal, but also adopts a correct policy during interaction with an MME to ensure that no conflict occurs in existing protocol architectures, so as to meet the different power saving requirements of the LTE terminal and the eMTC terminal.

SUMMARY

In view of the above, embodiments of the present disclosure provide a terminal default paging DRX setup method and apparatus, an electronic device, and a non-transitory computer-readable storage medium, where a paging policy capable of distinguishing terminals is proposed to meet different power saving requirements of an LTE terminal and an eMTC terminal, thereby solving the problem that conventional technologies cannot provide the eMTC terminal with a different paging policy from that for the LTE terminal in certain cases, improving the power saving effect of the eMTC terminal, and prolonging the standby time of the eMTC terminal.

To solve the above technical problems to at least a certain extent, the following technical schemes are employed in the present disclosure.

In accordance with an aspect of the present disclosure, an embodiment provides a terminal default paging DRX setup method. The method may include: determining a terminal setup policy for terminal Default Paging DRX; determining a value of Default Paging DRX in an S1 Setup Request message and/or an S1 Configuration Update message according to the terminal setup policy; and determining, by a base station, a paging time of a terminal type according to a Paging DRX parameter in S1 Paging message received from a core network, where the Paging DRX parameter is carried in the S1 Paging message to the base station when the core network initiates paging, the Paging DRX parameter is set according to the Default Paging DRX and a value of UE-specific paging DRX, and the value of the UE-specific paging DRX is carried in a NAS message to the core network during UE registration.

In accordance with another aspect of the present disclosure, an embodiment provides a terminal default paging DRX setup apparatus, applicable to the terminal default paging DRX setup method described in the embodiments of the present disclosure. The apparatus may include: a setup module, configured to determine a terminal setup policy for terminal Default Paging DRX; a selection module, configured to determine a value of Default Paging DRX in an S1 Setup Request message and/or an S1 Configuration Update message according to the terminal setup policy; and a determination module, configured to determine a paging time of a terminal type according to a Paging DRX parameter in S1 Paging message received from a core network, where the Paging DRX parameter is carried in the S1 Paging message to the base station when the core network initiates paging, the Paging DRX parameter is set according to the Default Paging DRX and a value of UE-specific paging DRX, and the value of the UE-specific paging DRX is carried in a NAS message to the core network during UE registration.

In accordance with yet another aspect of the present disclosure, an embodiment provides an electronic device. The device may include: a memory, a processor, and a computer program stored in the memory and executable by the processor which, when executed by the processor, causes the processor to implement the terminal default paging DRX setup method provided in the embodiments of the present disclosure.

In accordance with yet another aspect of the present disclosure, an embodiment provides a non-transitory computer-readable storage medium, storing a program of a terminal default paging DRX setup method which, when executed by a processor, causes the processor to implement the terminal default paging DRX setup method provided in the embodiments of the present disclosure.

The objectives, functional features, and advantages of the present disclosure will be further described with reference to the accompanying drawings and embodiments.

DETAILED DESCRIPTION

To make the technical problem to be solved, the technical scheme, and the beneficial effects of the present disclosure clear, the present disclosure is described in further detail below with reference to the accompanying drawings and embodiments. It should be understood that the embodiments described herein are merely used for illustrating the present disclosure, and are not intended to limit the present disclosure.

In the following description, suffixes such as "module", "component", or "unit" used to represent elements are used for facilitate the description of the present disclosure only, and do not have special meanings. Therefore, "module", "component", and "unit" may be used interchangeably.

It should be noted that in the description, claims, and accompanying drawings of the embodiments of the present disclosure, the terms "first", "second" or the like are intended to distinguish between similar objects, and are not necessarily used to describe a specific sequence or a precedence order.

Figure 1:
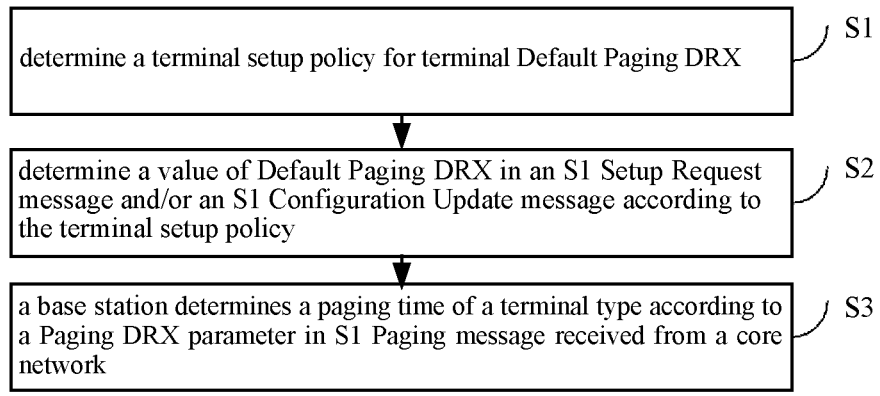
FIG. 1 is a schematic flowchart of a terminal default paging DRX setup method according to an embodiment of the present disclosure.

In an embodiment, as shown in FIG. 1, the present disclosure provides a terminal default paging DRX setup method. The method includes the following steps S1 to S3.

At S1, a terminal setup policy for terminal Default Paging DRX is determined.

At S2, a value of Default Paging DRX in an S1 Setup Request message and/or an S1 Configuration Update message is determined according to the terminal setup policy.

At S3, a base station determines a paging time of a terminal type according to a Paging DRX parameter in S1 Paging message received from an MME in a core network, where the Paging DRX parameter is carried in the S1 Paging message to the base station when the MME in the core network initiates paging, the Paging DRX parameter is set according to the Default Paging DRX and a value of UE-specific paging DRX, and the value of the UE-specific paging DRX is carried in a Non-Access Stratum (NAS) message to the MME in the core network during UE registration.

In the embodiment, the base station determines the terminal setup policy for terminal Default Paging DRX, determines the value of Default Paging DRX in the S1 Setup Request message and/or the S1 Configuration Update message according to the terminal setup policy, and determines the paging time of the terminal type according to the Paging DRX parameter in the S1 Paging message received from the core network, thus proposing an explicit paging policy capable of distinguishing terminals, which can set respective default paging DRX for the LTE terminal and the eMTC terminal and enable the base station to adopt a correct policy to interact with an MME in the case where only one default paging DRX can be transmitted in an existing S1 paging message. In this way, it is ensured that no conflict occurs in existing protocol architectures, and the different power saving requirements of the LTE terminal and the eMTC terminal are met, thereby solving the problem that conventional technologies cannot provide the eMTC terminal with a different paging policy from that for the LTE terminal in certain cases, improving the power saving effect of the eMTC terminal, and prolonging the standby time of the eMTC terminal.

In an embodiment, at S1, the terminal setup policy includes: setting default paging DRX of an LTE terminal and default paging DRX of an eMTC terminal to two independent parameters on a base station, where values of the two independent parameters are allowed to be the same or different.

In an embodiment, at S2, the determining a value of Default Paging DRX in an S1 Setup Request message and/or an S1 Configuration Update message according to the terminal setup policy includes: setting the Default Paging DRX in the S1 Setup Request message or the Default Paging DRX in the S1 Configuration Update message to either one of default paging DRX of the LTE terminal and default paging DRX of the eMTC terminal according to the terminal setup policy if the default paging DRX of the LTE terminal is equal to the default paging DRX of the eMTC terminal; and setting the Default Paging DRX in the S1 Setup Request message or the Default Paging DRX in the S1 Configuration Update message to a larger one of the default paging DRX of the LTE terminal and the default paging DRX of the eMTC terminal if the default paging DRX of the LTE terminal is not equal to the default paging DRX of the eMTC terminal.

In the embodiment, by determining the terminal setup policy for terminal Default Paging DRX and determining the value of Default Paging DRX in the S1 Setup Request message and/or the S1 Configuration Update message according to the terminal setup policy, an explicit paging policy capable of distinguishing terminals is proposed, which can set respective default paging DRX for the LTE terminal and the eMTC terminal and enable the base station to adopt a correct policy to interact with an MME in the case where only one default paging DRX can be transmitted in an existing S1 paging message. In this way, it is ensured that no conflict occurs in existing protocol architectures, and the different power saving requirements of the LTE terminal and the eMTC terminal are met, thereby solving the problem that conventional technologies cannot provide the eMTC terminal with a different paging policy from that for the LTE terminal in certain cases, improving the power saving effect of the eMTC terminal, and prolonging the standby time of the eMTC terminal.

In an embodiment, at S3, that the Paging DRX parameter is set according to the Default Paging DRX and a value of UE-specific paging DRX includes: the MME sets the Paging DRX parameter in the S1 Paging message to the obtained Default Paging DRX of the base station if the NAS message during the UE registration does not carry the UE-specific paging DRX; and the MME sets the Paging DRX parameter in the S1 Paging message to a smaller one of the Default Paging DRX and the UE-specific paging DRX obtained through comparison if the NAS message during the UE registration carries the UE-specific paging DRX.

In the embodiment, by setting the Paging DRX parameter in the S1 Paging message of the MME according to the Default Paging DRX and the value of the UE-specific paging DRX, the base station is enabled to adopt a correct policy to interact with an MME in the case where only one default paging DRX can be transmitted in an existing S1 paging message. In this way, it is ensured that no conflict occurs in existing protocol architectures, and the different power saving requirements of the LTE terminal and the eMTC terminal are met, thereby solving the problem that conventional technologies cannot provide the eMTC terminal with a different paging policy from that for the LTE terminal in certain cases, improving the power saving effect of the eMTC terminal, and prolonging the standby time of the eMTC terminal.

In an embodiment, at S3, the determining, by a base station, a paging time of a terminal type according to a Paging DRX parameter in S1 Paging message received from an MME in a core network includes: obtaining, by the base station, a T value of a corresponding terminal type in 3GPP TS 36.304 according to the Paging DRX parameter in the S1 Paging message received from the MME in the core network and default paging DRX of the corresponding terminal type; and calculating a paging time of the corresponding terminal type according to the T value, where the paging time includes Paging Frame and Paging Occasion.

In an embodiment, the obtaining, by the base station, a T value of a corresponding terminal type in 3GPP TS 36.304 according to the Paging DRX parameter in the S1 Paging message received from the MME in the core network and default paging DRX of the corresponding terminal type includes: comparing, by the base station, the Paging DRX parameter in the S1 Paging message received from the MME in the core network and the default paging DRX of the corresponding terminal type to take a smaller one as the T value of the corresponding terminal type in 3GPP TS 36.304.

In the embodiment, the base station determines the paging time of the corresponding terminal type according to the Paging DRX parameter in the S1 Paging message received from the MME in the core network and the default paging DRX of the corresponding terminal type, thus proposing an explicit paging policy capable of distinguishing terminals, which can set respective default paging DRX for the LTE terminal and the eMTC terminal and enable the base station to adopt a correct policy to interact with an MME in the case where only one default paging DRX can be transmitted in an existing S1 paging message. In this way, it is ensured that no conflict occurs in existing protocol architectures, and the different power saving requirements of the LTE terminal and the eMTC terminal are met, thereby solving the problem that conventional technologies cannot provide the eMTC terminal with a different paging policy from that for the LTE terminal in certain cases, improving the power saving effect of the eMTC terminal, and prolonging the standby time of the eMTC terminal.

Figure 2:
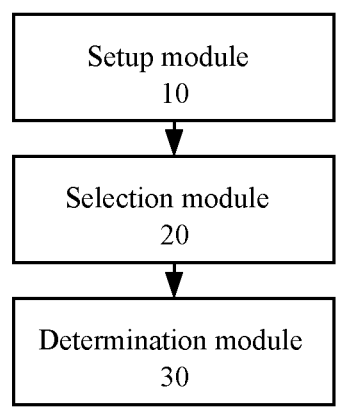
FIG. 2 is a schematic structural diagram of a terminal default paging DRX setup apparatus according to an embodiment of the present disclosure.

In an embodiment, as shown in FIG. 2, the present disclosure provides a terminal default paging DRX setup apparatus. The apparatus includes: a setup module 10, a selection module 20, and a determination module 30. The setup module 10 is configured to determine a terminal setup policy for terminal Default Paging DRX. The selection module 20 is configured to determine a value of Default Paging DRX in an S1 Setup Request message and/or an S1 Configuration Update message according to the terminal setup policy. The determination module 30 is configured to determine a paging time of a terminal type according to a Paging DRX parameter in S1 Paging message received from an MME in a core network. The Paging DRX parameter is carried in the S1 Paging message to the base station when the MME in the core network initiates paging. The Paging DRX parameter is set according to the Default Paging DRX and a value of UE-specific paging DRX. The value of the UE-specific paging DRX is carried in a NAS message to the MME during UE registration.

In the embodiment, the setup module determines the terminal setup policy for terminal Default Paging DRX, the selection module determines the value of Default Paging DRX in the S1 Setup Request message and/or the S1 Configuration Update message according to the terminal setup policy, and the determination module determines the paging time of the terminal type according to the Paging DRX parameter in the S1 Paging message received from a core network, thus proposing an explicit paging policy capable of distinguishing terminals, which can set respective default paging DRX for the LTE terminal and the eMTC terminal and enable the base station to adopt a correct policy to interact with an MME in the case where only one default paging DRX can be transmitted in an existing S1 paging message. In this way, it is ensured that no conflict occurs in existing protocol architectures, and the different power saving requirements of the LTE terminal and the eMTC terminal are met, thereby solving the problem that conventional technologies cannot provide the eMTC terminal with a different paging policy from that for the LTE terminal in certain cases, improving the power saving effect of the eMTC terminal, and prolonging the standby time of the eMTC terminal.

In an embodiment, the terminal setup policy includes: setting default paging DRX of an LTE terminal and default paging DRX of an eMTC terminal to two independent parameters on a base station, where values of the two independent parameters are allowed to be the same or different.

In an embodiment, the selection module 20 is configured to execute the following operations: setting the Default Paging DRX in the S1 Setup Request message or the Default Paging DRX in the S1 Configuration Update message to either one of default paging DRX of an LTE terminal and default paging DRX of an eMTC terminal according to the terminal setup policy if the default paging DRX of the LTE terminal is equal to the default paging DRX of the eMTC terminal; and setting the Default Paging DRX in the S1 Setup Request message or the Default Paging DRX in the S1 Configuration Update message to a larger one of the default paging DRX of the LTE terminal and the default paging DRX of the eMTC terminal if the default paging DRX of the LTE terminal is not equal to the default paging DRX of the eMTC terminal.

In the embodiment, the selection module determines the value of Default Paging DRX in the S1 Setup Request message and/or the S1 Configuration Update message according to the terminal setup policy, thus proposing an explicit paging policy capable of distinguishing terminals, which can set respective default paging DRX for the LTE terminal and the eMTC terminal and enable the base station to adopt a correct policy to interact with an MME in the case where only one default paging DRX can be transmitted in an existing S1 paging message. In this way, it is ensured that no conflict occurs in existing protocol architectures, and the different power saving requirements of the LTE terminal and the eMTC terminal are met, thereby solving the problem that conventional technologies cannot provide the eMTC terminal with a different paging policy from that for the LTE terminal in certain cases, improving the power saving effect of the eMTC terminal, and prolonging the standby time of the eMTC terminal.

In an embodiment, that the Paging DRX parameter is set according to the Default Paging DRX and a value of UE-specific paging DRX includes: the MME sets the Paging DRX parameter in the S1 Paging message to the obtained Default Paging DRX of the base station if the NAS message during the UE registration does not carry the UE-specific paging DRX; and the MME sets the Paging DRX parameter in the S1 Paging message to a smaller one of the Default Paging DRX and the UE-specific paging DRX obtained through comparison if the NAS message during the UE registration carries the UE-specific paging DRX.

In the embodiment, by setting the Paging DRX parameter in the S1 Paging message of the MME according to the Default Paging DRX and the value of the UE-specific paging DRX, the base station is enabled to adopt a correct policy to interact with an MME in the case where only one default paging DRX can be transmitted in an existing S1 paging message. In this way, it is ensured that no conflict occurs in existing protocol architectures, and the different power saving requirements of the LTE terminal and the eMTC terminal are met, thereby solving the problem that conventional technologies cannot provide the eMTC terminal with a different paging policy from that for the LTE terminal in certain cases, improving the power saving effect of the eMTC terminal, and prolonging the standby time of the eMTC terminal.

In an embodiment, the determination module 30 is further configured to execute the following operations: obtaining a T value of a corresponding terminal type in 3GPP TS 36.304 according to the Paging DRX parameter in the S1 Paging message received from the MME in the core network and default paging DRX of the corresponding terminal type; and calculating a paging time of the corresponding terminal type according to the T value, where the paging time includes Paging Frame and Paging Occasion.

In an embodiment, the obtaining a T value of a corresponding terminal type in 3GPP TS 36.304 according to the Paging DRX parameter in the S1 Paging message received from the MME in the core network and default paging DRX of the corresponding terminal type includes: comparing, by the determination module, the Paging DRX parameter in the S1 Paging message received from the MME in the core network and the default paging DRX of the corresponding terminal type to take a smaller one as the T value of the corresponding terminal type in 3GPP TS 36.304.

In the embodiment, the determination module determines the paging time of the corresponding terminal type according to the Paging DRX parameter in the S1 Paging message received from the MME in the core network and the default paging DRX of the corresponding terminal type, thus proposing an explicit paging policy capable of distinguishing terminals, which can set respective default paging DRX for the LTE terminal and the eMTC terminal and enable the base station to adopt a correct policy to interact with an MME in the case where only one default paging DRX can be transmitted in an existing S1 paging message. In this way, it is ensured that no conflict occurs in existing protocol architectures, and the different power saving requirements of the LTE terminal and the eMTC terminal are met, thereby solving the problem that conventional technologies cannot provide the eMTC terminal with a different paging policy from that for the LTE terminal in certain cases, improving the power saving effect of the eMTC terminal, and prolonging the standby time of the eMTC terminal.

It should be noted that the apparatus embodiments belong to the same concept as the method embodiments, specific implementation processes of the apparatus embodiments are as detailed in the method embodiments, and the technical features in the method embodiments are all applicable in the apparatus embodiments, so the details will not be repeated here.

The technical schemes of the present disclosure will be described in further detail below with reference to specific embodiments and the accompanying drawings.

Figure 3:
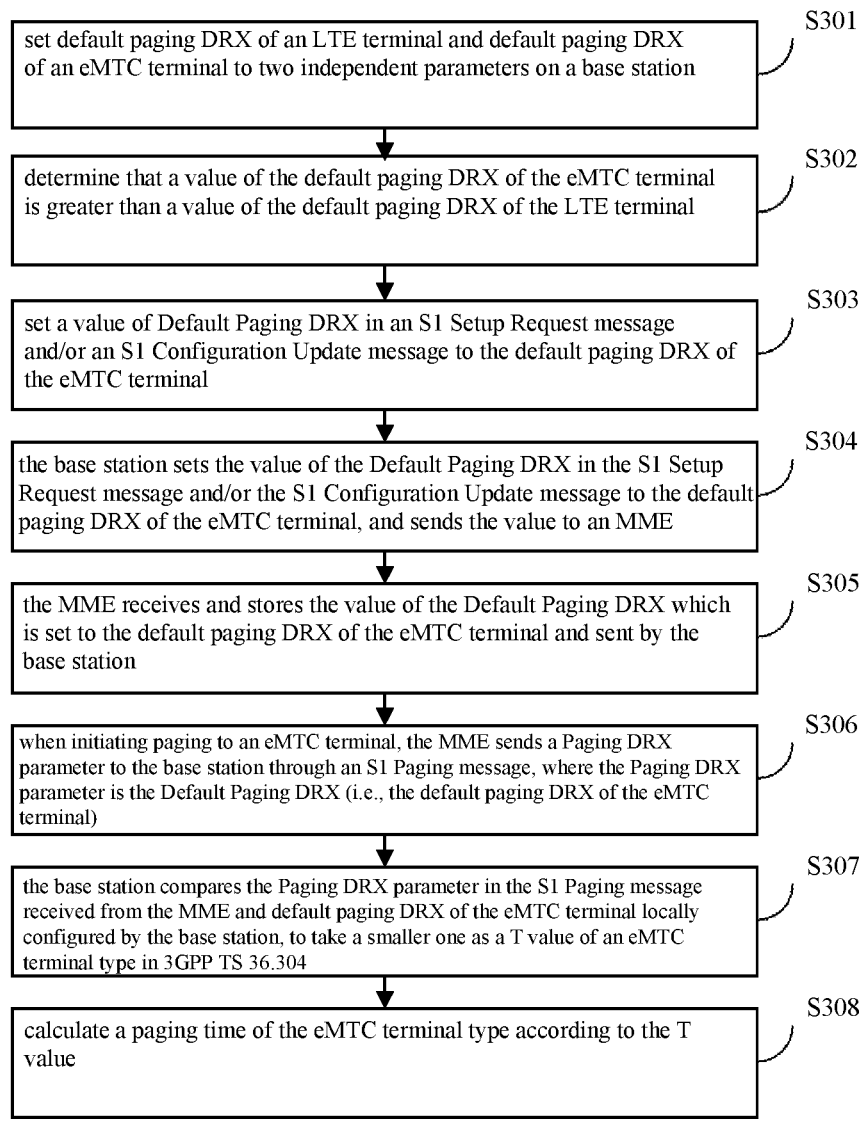
FIG. 3 is a schematic flowchart of a terminal default paging DRX setup method according to an embodiment of the present disclosure.

In an embodiment, as shown in FIG. 3, the present disclosure provides a terminal default paging DRX setup method. In the embodiment, a value of default paging DRX for an eMTC terminal is greater than a value of default paging DRX for an LTE terminal on a base station, an NAS message during UE registration does not carry UE-specific paging DRX, and a UE to be paged is an eMTC terminal.

The terminal default paging DRX setup method includes the following steps S301 to S308.

At S301, default paging DRX of an LTE terminal and default paging DRX of an eMTC terminal are set to two independent parameters on a base station.

At S302, a determination is made that a value of the default paging DRX of the eMTC terminal is greater than a value of the default paging DRX of the LTE terminal.

At S303, a value of Default Paging DRX in an S1 Setup Request message and/or an S1 Configuration Update message is set to the default paging DRX of the eMTC terminal.

The Default Paging DRX in the S1 Setup Request message or the Default Paging DRX in the S1 Configuration Update message is set to a larger one of the default paging DRX of the LTE terminal and the default paging DRX of the eMTC terminal when the default paging DRX of the LTE terminal is not equal to the default paging DRX of the eMTC terminal.

In the embodiment, because the value of the default paging DRX of the eMTC terminal is greater than the value of the default paging DRX of the LTE terminal, the value of the Default Paging DRX in the S1 Setup Request message and/or the S1 Configuration Update message is set to the default paging DRX of the eMTC terminal.

At S304, the base station sets the value of the Default Paging DRX in the S1 Setup Request message and/or the S1 Configuration Update message to the default paging DRX of the eMTC terminal, and sends the value to an MME in a core network.

At S305, the MME in the core network receives and stores the value of the Default Paging DRX which is set to the default paging DRX of the eMTC terminal and sent by the base station through the S1 Setup Request message or the S1 Configuration Update message.

At S306, when initiating an eMTC terminal paging, the MME in the core network sends a Paging DRX parameter to the base station through an S1 Paging message, where the Paging DRX parameter is the obtained Default Paging DRX of the base station (i.e., the default paging DRX of the eMTC terminal).

In the embodiment, because the NAS message during the UE registration does not carry the UE-specific paging DRX, the MME in the core network sets the Paging DRX parameter in the S1 Paging message to the obtained Default Paging DRX of the base station (i.e., the default paging DRX of the eMTC terminal).

At S307, the base station compares the Paging DRX parameter in the S1 Paging message received from the MME in the core network and default paging DRX of the eMTC terminal locally configured by the base station, to take a smaller one as a T value of an eMTC terminal type in 3GPP TS 36.304.

At S308, a paging time of the eMTC terminal type is calculated according to the T value, where the paging time includes Paging Frame and Paging Occasion.

Figure 4:
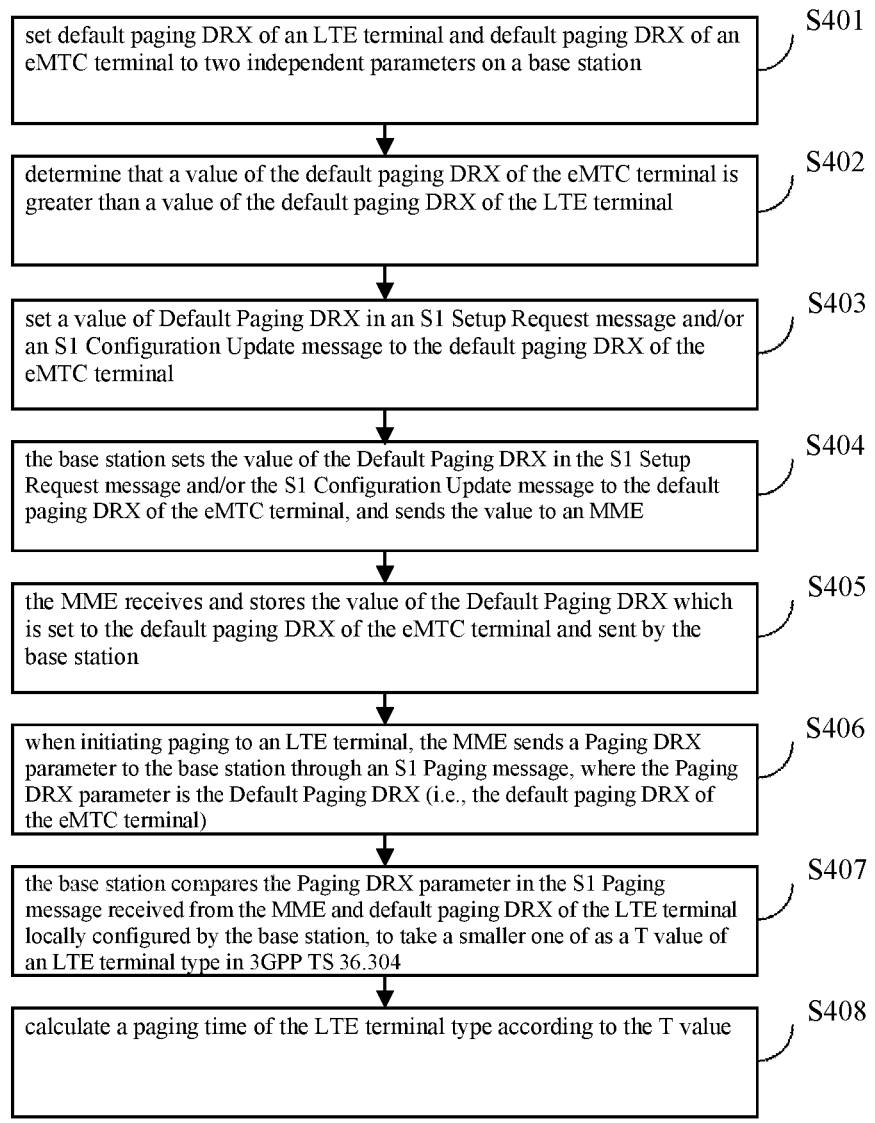
FIG. 4 is a schematic flowchart of another terminal default paging DRX setup method according to an embodiment of the present disclosure.

In an embodiment, as shown in FIG. 4, the present disclosure provides a terminal default paging DRX setup method. In the embodiment, a value of default paging DRX for an eMTC terminal is greater than a value of default paging DRX for an LTE terminal on a base station, an NAS message during UE registration does not carry UE-specific paging DRX, and a UE to be paged is an LTE terminal.

The terminal default paging DRX setup method includes the following steps S401 to S408.

At S401, default paging DRX of an LTE terminal and default paging DRX of an eMTC terminal are set to two independent parameters on a base station.

At S402, a determination is made that a value of the default paging DRX of the eMTC terminal is greater than a value of the default paging DRX of the LTE terminal.

At S403, a value of Default Paging DRX in an S1 Setup Request message and/or an S1 Configuration Update message is set to the default paging DRX of the eMTC terminal.

The Default Paging DRX in the S1 Setup Request message or the Default Paging DRX in the S1 Configuration Update message is set to a larger one of the default paging DRX of the LTE terminal and the default paging DRX of the eMTC terminal if the default paging DRX of the LTE terminal is not equal to the default paging DRX of the eMTC terminal.

In the embodiment, because the value of the default paging DRX of the eMTC terminal is greater than the value of the default paging DRX of the LTE terminal, the value of the Default Paging DRX in the S1 Setup Request message and/or the S1 Configuration Update message is set to the default paging DRX of the eMTC terminal.

At S404, the base station sets the value of the Default Paging DRX in the S1 Setup Request message and/or the S1 Configuration Update message to the default paging DRX of the eMTC terminal, and sends the value to an MME in a core network.

At S405, the MME in the core network receives and stores the value of the Default Paging DRX which is set to the default paging DRX of the eMTC terminal and sent by the base station through the S1 Setup Request message or the S1 Configuration Update message.

At S406, when initiating paging to an LTE terminal, the MME in the core network sends a Paging DRX parameter to the base station through an S1 Paging message, where the Paging DRX parameter is the obtained Default Paging DRX of the base station (i.e., the default paging DRX of the eMTC terminal).

In the embodiment, because the NAS message during the UE registration does not carry the UE-specific paging DRX, the MME in the core network sets the Paging DRX parameter in the S1 Paging message to the obtained Default Paging DRX of the base station (i.e., the default paging DRX of the eMTC terminal).

At S407, the base station compares the Paging DRX parameter in the S1 Paging message received from the MME in the core network and default paging DRX of the LTE terminal locally configured by the base station, to take a smaller one as a T value of an LTE terminal type in 3GPP TS 36.304.

At S408, a paging time of the LTE terminal type is calculated according to the T value, where the paging time includes Paging Frame and Paging Occasion.

Figure 5:
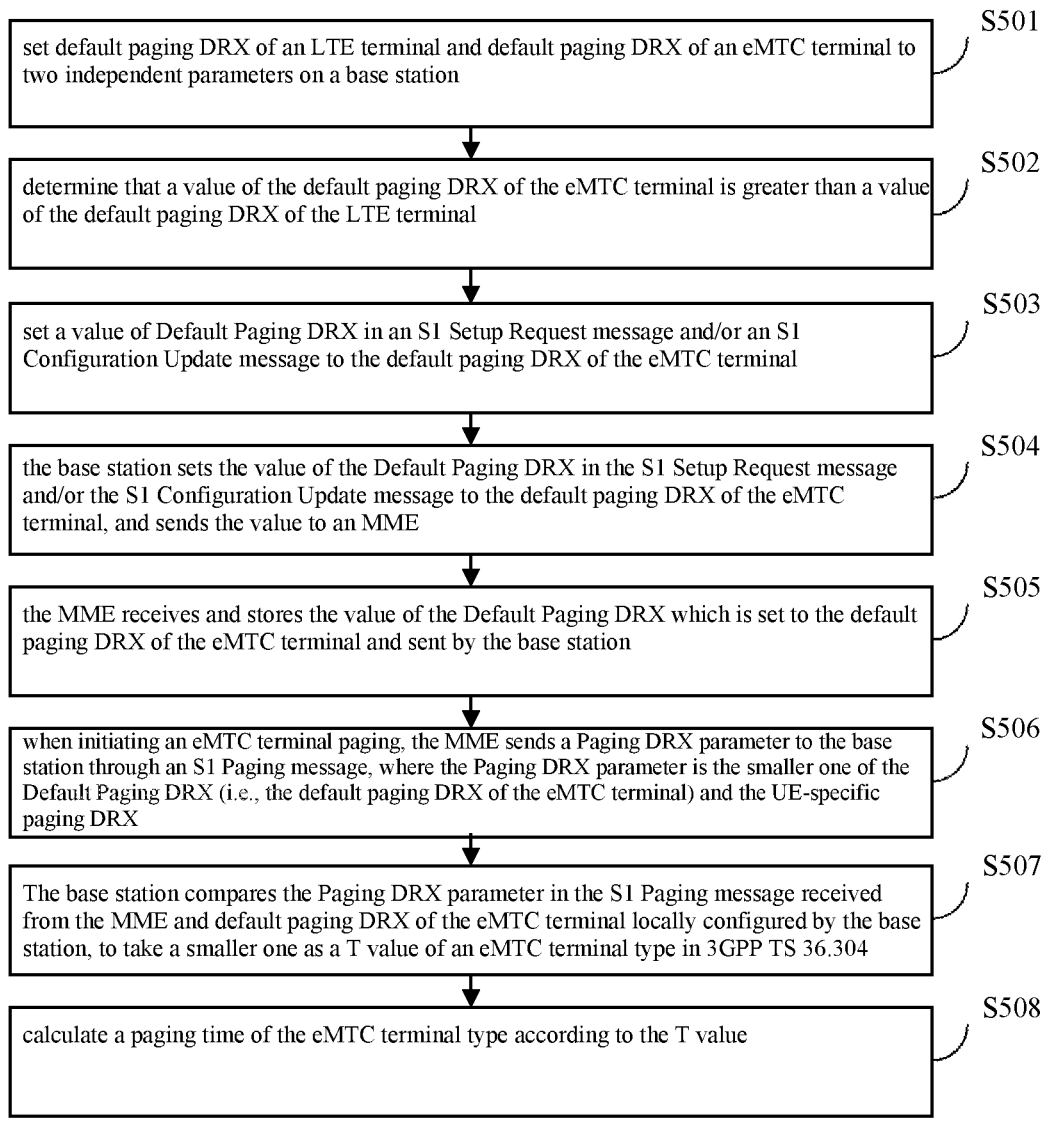
FIG. 5 is a schematic flowchart of yet another terminal default paging DRX setup method according to an embodiment of the present disclosure.

In an embodiment, as shown in FIG. 5, the present disclosure provides a terminal default paging DRX setup method. In the embodiment, a value of default paging DRX for an eMTC terminal is greater than a value of default paging DRX for an LTE terminal on a base station, an NAS message during UE registration carries UE-specific paging DRX, and a UE to be paged is an eMTC terminal.

The terminal default paging DRX setup method includes the following steps S501 to S508.

At S501, default paging DRX of an LTE terminal and default paging DRX of an eMTC terminal are set to two independent parameters on a base station.

At S502, a determination is made that a value of the default paging DRX of the eMTC terminal is greater than a value of the default paging DRX of the LTE terminal.

At S503, a value of Default Paging DRX in an S1 Setup Request message and/or an S1 Configuration Update message is set to the default paging DRX of the eMTC terminal.

The Default Paging DRX in the S1 Setup Request message or the Default Paging DRX in the S1 Configuration Update message is set to a larger one of the default paging DRX of the LTE terminal and the default paging DRX of the eMTC terminal when the default paging DRX of the LTE terminal is not equal to the default paging DRX of the eMTC terminal.

In the embodiment, because the value of the default paging DRX of the eMTC terminal is greater than the value of the default paging DRX of the LTE terminal, the value of the Default Paging DRX in the S1 Setup Request message and/or the S1 Configuration Update message is set to the default paging DRX of the eMTC terminal.

At S504, the base station sets the value of the Default Paging DRX in the S1 Setup Request message and/or the S1 Configuration Update message to the default paging DRX of the eMTC terminal, and sends the value to an MME in a core network.

At S505, the MME in the core network receives and stores the value of the Default Paging DRX which is set to the default paging DRX of the eMTC terminal and sent by the base station through the S1 Setup Request message or the S1 Configuration Update message.

At S506, when initiating an eMTC terminal paging, the MME in the core network sends a Paging DRX parameter to the base station through an S1 Paging message, where the Paging DRX parameter is a smaller one of the obtained Default Paging DRX of the base station (i.e., the default paging DRX of the eMTC terminal) and the UE-specific paging DRX obtained through comparison.

At S507, the base station compares the Paging DRX parameter in the S1 Paging message received from the MME in the core network and default paging DRX of the eMTC terminal locally configured by the base station, to take a smaller one as a T value of an eMTC terminal type in 3GPP TS 36.304.

At S508, a paging time of the eMTC terminal type is calculated according to the T value, where the paging time includes Paging Frame and Paging Occasion.

Figure 6:
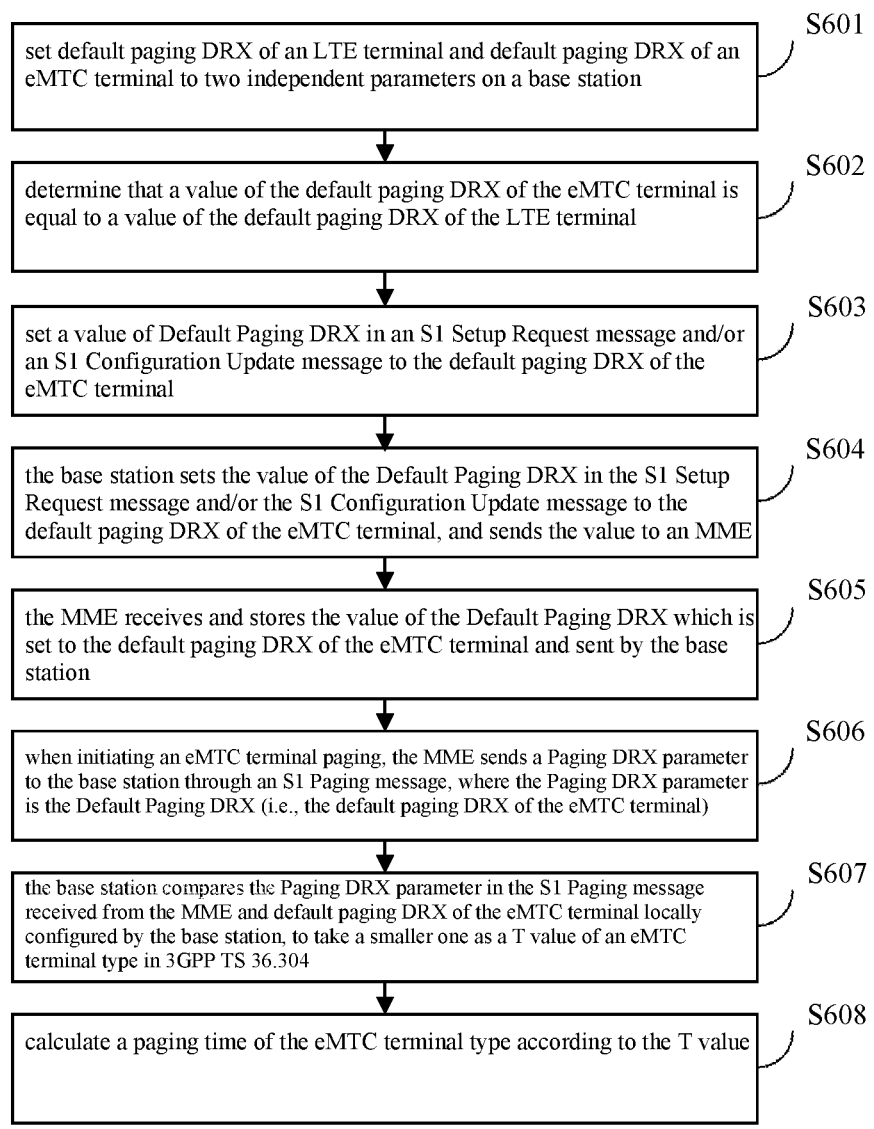
FIG. 6 is a schematic flowchart of yet another terminal default paging DRX setup method according to an embodiment of the present disclosure.

In an embodiment, as shown in FIG. 6, the present disclosure provides a terminal default paging DRX setup method. In the embodiment, a value of default paging DRX for an eMTC terminal is equal to a value of default paging DRX for an LTE terminal on a base station, an NAS message during UE registration does not carry UE-specific paging DRX, and a UE to be paged is an eMTC terminal.

The terminal default paging DRX setup method includes the following steps S601 to S608.

At S601, default paging DRX of an LTE terminal and default paging DRX of an eMTC terminal are set to two independent parameters on a base station.

At S602, a determination is made that a value of the default paging DRX of the eMTC terminal is equal to a value of the default paging DRX of the LTE terminal.

At S603, a value of Default Paging DRX in an S1 Setup Request message and/or an S1 Configuration Update message is set to the default paging DRX of the eMTC terminal.

The Default Paging DRX in the S1 Setup Request message or the Default Paging DRX in the S1 Configuration Update message is set to either one of the default paging DRX of the LTE terminal and the default paging DRX of the eMTC terminal when the default paging DRX of the LTE terminal is equal to the default paging DRX of the eMTC terminal.

In the embodiment, because the default paging DRX of the LTE terminal is equal to the default paging DRX of the eMTC terminal, the value of the Default Paging DRX in the S1 Setup Request message and/or the S1 Configuration Update message is set to the default paging DRX of the eMTC terminal.

At S604, the base station sets the value of the Default Paging DRX in the S1 Setup Request message and/or the S1 Configuration Update message to the default paging DRX of the eMTC terminal, and sends the value to an MME in a core network.

At S605, the MME in the core network receives and stores the value of the Default Paging DRX which is set to the default paging DRX of the eMTC terminal and sent by the base station through the S1 Setup Request message or the S1 Configuration Update message.

At S606, when initiating an eMTC terminal paging, the MME in the core network sends a Paging DRX parameter to the base station through an S1 Paging message, where the Paging DRX parameter is the obtained Default Paging DRX of the base station (i.e., the default paging DRX of the eMTC terminal).

In the embodiment, because the NAS message during the UE registration does not carry the UE-specific paging DRX, the MME in the core network sets the Paging DRX parameter in the S1 Paging message to the obtained Default Paging DRX of the base station (i.e., the default paging DRX of the eMTC terminal).

At S607, the base station compares the Paging DRX parameter in the S1 Paging message received from the MME in the core network and default paging DRX of the eMTC terminal locally configured by the base station, to take a smaller one as a T value of an eMTC terminal type in 3GPP TS 36.304.

At S608, a paging time of the eMTC terminal type is calculated according to the T value, where the paging time includes Paging Frame and Paging Occasion.

Figure 7:
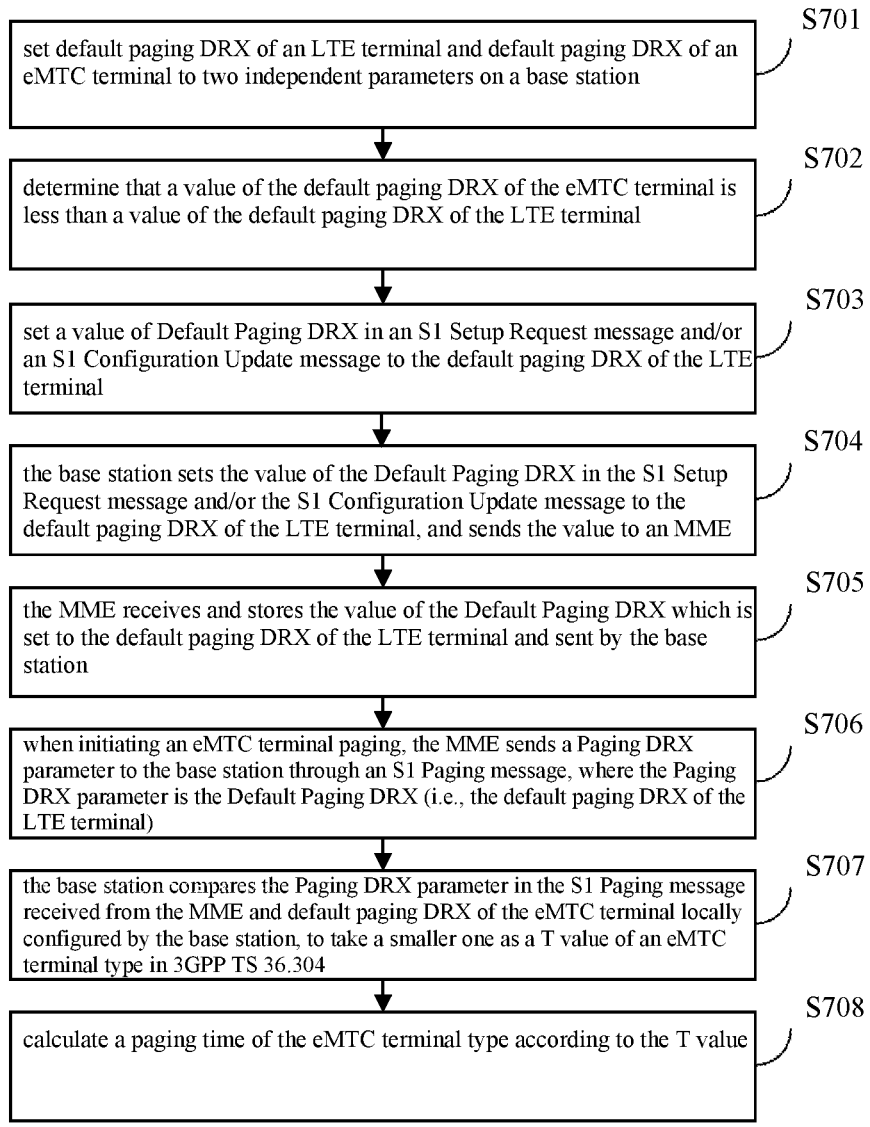
FIG. 7 is a schematic flowchart of yet terminal default paging DRX setup method according to an embodiment of the present disclosure.

In an embodiment, as shown in FIG. 7, the present disclosure provides a terminal default paging DRX setup method. In the embodiment, a value of default paging DRX for an eMTC terminal is less than a value of default paging DRX for an LTE terminal on a base station, an NAS message during UE registration does not carry UE-specific paging DRX, and a UE to be paged is an eMTC terminal.

The terminal default paging DRX setup method includes the following steps S701 to S708.

At S701, default paging DRX of an LTE terminal and default paging DRX of an eMTC terminal are set to two independent parameters on a base station.

At S702, a determination is made that a value of the default paging DRX of the eMTC terminal is less than a value of the default paging DRX of the LTE terminal.

At S703, a value of Default Paging DRX in an S1 Setup Request message and/or an S1 Configuration Update message is set to the default paging DRX of the LTE terminal.

The Default Paging DRX in the S1 Setup Request message or the Default Paging DRX in the S1 Configuration Update message is set to a larger one of the default paging DRX of the LTE terminal and the default paging DRX of the eMTC terminal when to the default paging DRX of the LTE terminal is not equal to the default paging DRX of the eMTC terminal.

In the embodiment, because the value of the default paging DRX of the eMTC terminal is less than the value of the default paging DRX of the LTE terminal, the value of the Default Paging DRX in the S1 Setup Request message and/or the S1 Configuration Update message is set to the default paging DRX of the LTE terminal.

At S704, the base station sets the value of the Default Paging DRX in the S1 Setup Request message and/or the S1 Configuration Update message to the default paging DRX of the LTE terminal, and sends the value to an MME in a core network.

At S705, the MME in the core network receives and stores the value of the Default Paging DRX which is set to the default paging DRX of the LTE terminal and sent by the base station through the S1 Setup Request message or the S1 Configuration Update message.

At S706, when initiating an eMTC terminal paging, the MME in the core network sends a Paging DRX parameter to the base station through an S1 Paging message, where the Paging DRX parameter is the obtained Default Paging DRX of the base station (i.e., the default paging DRX of the LTE terminal).

In the embodiment, because the NAS message during the UE registration does not carry the UE-specific paging DRX, the MME in the core network sets the Paging DRX parameter in the S1 Paging message to the obtained Default Paging DRX of the base station (i.e., the default paging DRX of the LTE terminal).

At S707, the base station compares the Paging DRX parameter in the S1 Paging message received from the MME in the core network and default paging DRX of the eMTC terminal locally configured by the base station, to take a smaller one as a T value of an eMTC terminal type in 3GPP TS 36.304.

At S708, a paging time of the eMTC terminal type is calculated according to the T value, where the paging time includes Paging Frame and Paging Occasion.

Figure 8:
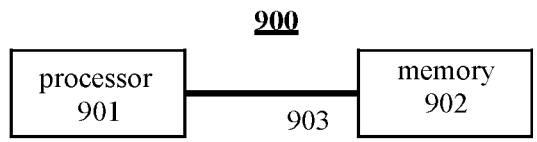
FIG. 8 is a schematic structural diagram of an electronic device according to an embodiment of the present disclosure.

In addition, an embodiment of the present disclosure further provides an electronic device. As shown in FIG. 8, the electronic device 900 includes: a memory 902, a processor 901, and one or more computer programs stored in the memory 902 and executable by the processor 901. The memory 902 and the processor 901 are coupled by a bus system 903. The one or more computer programs, when executed by the processor 901, cause the processor 901 to implement a terminal default paging DRX setup method provided in the embodiments of the present disclosure. The method includes steps S1 to S3.

At S1, a terminal setup policy for terminal Default Paging DRX is determined.

At S2, a value of Default Paging DRX in an S1 Setup Request message and/or an S1 Configuration Update message is determined according to the terminal setup policy.

At S3, a base station determines a paging time of a terminal type according to a Paging DRX parameter in S1 Paging message received from an MME in a core network, where the Paging DRX parameter is carried in the S1 Paging message to the base station when the MME in the core network initiates paging, the Paging DRX parameter is set according to the Default Paging DRX and a value of UE-specific paging DRX, and the value of the UE-specific paging DRX is carried in an NAS message to the MME in the core network during UE registration.

The methods disclosed in the above embodiments of the present disclosure may be applicable to the processor 901 or may be implemented by the processor 901. The processor 901 may be an integrated circuit chip with a signal processing capability. During the implementation process, the steps of the above methods may be implemented by an integrated logic circuit in hardware form in the processor 901 or by instructions in software form. The processor 901 may be a general-purpose processor, a DSP, or other programmable logic devices, a discrete gate or a transistor logic device, a discrete hardware component, and the like. The processor 901 may implement or execute the methods, steps, and logical block diagrams disclosed in the embodiments of the present disclosure. The general-purpose processor may be a microprocessor or any conventional processor or the like. The steps of the methods disclosed in the embodiments of the present disclosure may be directly executed by a hardware decoding processor, or executed by a combination of hardware and software modules in a decoding processor. The software module may be stored in a storage medium. The storage medium resides in the memory 902. The processor 901 reads information from the memory 902, and implements the steps of the above methods through its hardware.

It can be understood that the memory 902 in the embodiments of the present disclosure may be a volatile memory or a non-volatile memory, and may also include both a volatile memory and a non-volatile memory. The non-volatile memory may be a read-only memory (ROM), a programmable read-only memory (PROM), an erasable programmable read-only memory (EPROM) Only Memory), an electrically erasable programmable read-only memory (EEPROM), a ferromagnetic random access memory (FRAM), a flash memory or other memory technology, a compact disk read-only memory (CD-ROM), a digital video disk (DVD) or other optical disk storage, a magnetic cassette, a magnetic tape, a disk storage or other magnetic storage device. The volatile memory may be a random access memory (RAM). By way of example without limitation, many forms of RAMs are available, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchronous dynamic random access memory (ESDRAM), synclink dynamic random access memory (SLDRAM), and direct rambus random access memory (DRRAM). The memories described in the embodiments of the present disclosure are intended to include, but not limited to, these and any other suitable types of memories.

It should be noted that the embodiments of the electronic device belong to the same concept as the method embodiments, specific implementation processes of the apparatus embodiments are as detailed in the method embodiments, and the technical features in the method embodiments are all applicable in the embodiments of the electronic device, so the details will not be repeated here.

In addition, in an embodiment, the present disclosure further provides a computer storage medium, which is specifically a computer-readable storage medium and includes, for example, a memory 902 storing a computer program. The computer storage medium stores one or more programs of a method for resolving a conflict between default paging DRX of terminals. The one or more programs of the method for resolving a conflict between default paging DRX of terminals, when executed by a processor 901, causes the processor 901 to implement the following steps of the method for resolving a conflict between default paging DRX of terminals that is provided in the embodiments of the present disclosure. The method includes S1 to S3.

At S1, a terminal setup policy for terminal Default Paging DRX is determined.

At S2, a value of Default Paging DRX in an S1 Setup Request message and/or an S1 Configuration Update message is determined according to the terminal setup policy.

At S3, a base station determines a paging time of a terminal type according to a Paging DRX parameter in S1 Paging message received from an MME in a core network, where the Paging DRX parameter is carried in the S1 Paging message to the base station when the MME in the core network initiates paging, the Paging DRX parameter is set according to the Default Paging DRX and a value of UE-specific paging DRX, and the value of the UE-specific paging DRX is carried in an NAS message to the MME in the core network during UE registration.

Compared with the existing technology, the embodiments of the present disclosure propose a terminal default paging DRX setup method and apparatus, an electronic device, and a storage medium. The method includes: determining a terminal setup policy for terminal Default Paging DRX; determining a value of Default Paging DRX in an S1 Setup Request message and/or an S1 Configuration Update message according to the terminal setup policy; and determining, by a base station, a paging time of a terminal type according to a Paging DRX parameter in S1 Paging message received from a core network, where the Paging DRX parameter is carried in the S1 Paging message to the base station when the core network initiates paging, the Paging DRX parameter is set according to the Default Paging DRX and a value of UE-specific paging DRX, and the value of the UE-specific paging DRX is carried in a NAS message to the core network during UE registration. According to the embodiments of the present disclosure, a base station determines a terminal setup policy for terminal Default Paging DRX, determines a value of Default Paging DRX in an S1 Setup Request message and/or an S1 Configuration Update message according to the terminal setup policy, and determines a paging time of a terminal type according to a Paging DRX parameter in S1 Paging message received from a core network, thus proposing an explicit paging policy capable of distinguishing terminals, which can set respective default paging DRX for the LTE terminal and the eMTC terminal and enable the base station to adopt a correct policy to interact with an MME in the case where only one default paging DRX can be transmitted in an existing S1 paging message. In this way, it is ensured that no conflict occurs in existing protocol architectures, and the different power saving requirements of the LTE terminal and the eMTC terminal are met, thereby solving the problem that conventional technologies cannot provide the eMTC terminal with a different paging policy from that for the LTE terminal in certain cases, improving the power saving effect of the eMTC terminal, and prolonging the standby time of the eMTC terminal.

It should be noted that the program embodiment of the method for resolving a conflict between default paging DRX of terminals on the computer-readable storage medium belongs to the same concept as the method embodiments, specific implementation processes of the program embodiment are as detailed in the method embodiments, and the technical features in the method embodiments are all applicable in the embodiment of the computer-readable storage medium, so the details will not be repeated here.

It should be noted that in the present disclosure, the terms "comprise", "include" or any other variants are intended to encompass non-exclusive inclusion, such that a process, a method, an article or an apparatus including a series of elements not only include those elements, but also includes other elements not listed explicitly or includes intrinsic elements for the process, the method, the article, or the apparatus. Without any further limitation, an element modified by the phrase "comprising one" does not exclude the presence of other same elements in the process, the method, the article, or the apparatus that includes the elements.

The serial numbers of the embodiments of the present disclosure are only for the purpose of description, and do not represent the preference for the embodiments.

From the above detailed description of the embodiments, those having ordinary skill in the art can clearly understand that the methods in the above embodiments can be implemented by software and a necessary general-purpose hardware platform, and of course may also be implemented by hardware, but in many cases, the former is a better implementation. Based on such an understanding, the technical schemes of the present disclosure essentially or the part contributing to existing technologies may be embodied in the form of a software product. The computer software product is stored in a storage medium (such as a ROM/RAM, a magnetic disk, an optical disc, etc.), and includes several instructions for instructing a terminal (which may be a mobile phone, a computer, a server, an air conditioner, a network device, or the like) to execute the methods described in the embodiments of the present disclosure.

Although the embodiments of the present disclosure have been described above in conjunction with the accompanying drawings, the present disclosure is not limited to the specific embodiments described above, and the specific embodiments described above are merely illustrative and are not limiting. Those having ordinary skill in the art can make various changes and modifications based on the teachings of the present disclosure without departing from the protection scope of the present disclosure and the appended claims. Such changes and modifications also fall within the protection scope of the present disclosure.

What is claimed is:

1. A terminal default paging Discontinuous Reception (DRX) setup method, comprising:
   determining a terminal setup policy for terminal Default Paging DRX;
   setting the Default Paging DRX in an S1 Setup Request message or a Default Paging DRX in an S1 Configuration Update message to either one of default paging DRX of an LTE terminal and default paging DRX of an eMTC terminal according to the terminal setup policy, in response to the default paging DRX of the LTE terminal being equal to the default paging DRX of the eMTC terminal;
   setting the Default Paging DRX in the S1 Setup Request message or the Default Paging DRX in the S1 Configuration Update message to a larger one of the default paging DRX of the LTE terminal and the default paging DRX of the eMTC terminal, in response to the default paging DRX of the LTE terminal being not equal to the default paging DRX of the eMTC terminal; and
   determining, by a base station, a paging time of a terminal type according to a Paging DRX parameter in S1 Paging message received from a core network,
      wherein the Paging DRX parameter is carried in the S1 Paging message to the base station when the core network initiates paging,
      the Paging DRX parameter is set according to the Default Paging DRX and a value of UE-specific paging DRX, and
      the value of the UE-specific paging DRX is carried in a Non-Access Stratum (NAS) message to the core network during UE registration.

2. The method of claim 1, wherein the terminal setup policy comprises:
   setting default paging DRX of an LTE terminal and default paging DRX of an eMTC terminal to two independent parameters on a base station, wherein values of the two independent parameters are allowed to be the same or different.

3. The method of claim 1, wherein setting Paging DRX parameter according to the Default Paging DRX and a value of UE-specific paging DRX comprises:
   setting, by the core network, the Paging DRX parameter in the S1 Paging message to the obtained Default Paging DRX of the base station, in response to the NAS message during the UE registration not carrying the UE-specific paging DRX; and
   setting, by the core network, the Paging DRX parameter in the S1 Paging message to a smaller one of the Default Paging DRX and the UE-specific paging DRX obtained through comparison, in response to the NAS message during the UE registration carrying the UE-specific paging DRX.

4. The method of claim 1, wherein determining, by the base station, the paging time of a terminal type according to the Paging DRX parameter in S1 Paging message received from the core network comprises:
   obtaining a T value of a corresponding terminal type in 3GPP TS 36.304 according to the Paging DRX parameter in the S1 Paging message received from the core network and default paging DRX of the corresponding terminal type; and
   calculating a paging time of the corresponding terminal type according to the T value, wherein the paging time comprises Paging Frame and Paging Occasion.

5. The method of claim 4, wherein obtaining, by the base station, the T value of the corresponding terminal type in 3GPP TS 36.304 according to the Paging DRX parameter in the S1 Paging message received from the core network and default paging DRX of the corresponding terminal type comprises:
   comparing, by the base station, the Paging DRX parameter in the S1 Paging message received from the core network and the default paging DRX of the corresponding terminal type, to take a smaller one as the T value of the corresponding terminal type in 3GPP TS 36.304.

6. An electronic device, comprising:
a memory, a processor, and a computer program stored in the memory and executable by the processor which, when executed by the processor, causes the processor to carry out a terminal default paging DRX setup method comprising:
  determining a terminal setup policy for terminal Default Paging DRX;
  setting the Default Paging DRX in an S1 Setup Request message or a Default Paging DRX in an S1 Configuration Update message to either one of default paging DRX of an LTE terminal and default paging DRX of an eMTC terminal according to the terminal setup policy, in response to the default paging DRX of the LTE terminal being equal to the default paging DRX of the eMTC terminal;
  setting the Default Paging DRX in the S1 Setup Request message or the Default Paging DRX in the S1 Configuration Update message to a larger one of the default paging DRX of the LTE terminal and the default paging DRX of the eMTC terminal, in response to the default paging DRX of the LTE terminal being not equal to the default paging DRX of the eMTC terminal; and
  determining, by a base station, a paging time of a terminal type according to a Paging DRX parameter in S1 Paging message received from a core network,
    wherein the Paging DRX parameter is carried in the S1 Paging message to the base station when the core network initiates paging,
    the Paging DRX parameter is set according to the Default Paging DRX and a value of UE-specific paging DRX, and
    the value of the UE-specific paging DRX is carried in a Non-Access Stratum (NAS) message to the core network during UE registration.

7. A non-transitory computer-readable storage medium, storing a program of a terminal default paging DRX setup method which, when executed by a processor, causes the processor to carry out a terminal default paging DRX setup method, comprising:
  determining a terminal setup policy for terminal Default Paging DRX;
  setting the Default Paging DRX in an S1 Setup Request message or a Default Paging DRX in an S1 Configuration Update message to either one of default paging DRX of an LTE terminal and default paging DRX of an eMTC terminal according to the terminal setup policy, in response to the default paging DRX of the LTE terminal being equal to the default paging DRX of the eMTC terminal;
  setting the Default Paging DRX in the S1 Setup Request message or the Default Paging DRX in the S1 Configuration Update message to a larger one of the default paging DRX of the LTE terminal and the default paging DRX of the eMTC terminal, in response to the default paging DRX of the LTE terminal being not equal to the default paging DRX of the eMTC terminal; and
  determining, by a base station, a paging time of a terminal type according to a Paging DRX parameter in S1 Paging message received from a core network,
    wherein the Paging DRX parameter is carried in the S1 Paging message to the base station when the core network initiates paging,
    the Paging DRX parameter is set according to the Default Paging DRX and a value of UE-specific paging DRX, and
    the value of the UE-specific paging DRX is carried in a Non-Access Stratum (NAS) message to the core network during UE registration.

8. The method of claim 2, wherein setting Paging DRX parameter according to the Default Paging DRX and the value of UE-specific paging DRX comprises:
  setting, by the core network, the Paging DRX parameter in the S1 Paging message to the obtained Default Paging DRX of the base station, in response to the NAS message during the UE registration not carrying the UE-specific paging DRX; and
  setting, by the core network, the Paging DRX parameter in the S1 Paging message to a smaller one of the Default Paging DRX and the UE-specific paging DRX obtained through comparison, in response to the NAS message during the UE registration carrying the UE-specific paging DRX.

9. The method of claim 1, wherein setting Paging DRX parameter according to the Default Paging DRX and the value of UE-specific paging DRX comprises:
  setting, by the core network, the Paging DRX parameter in the S1 Paging message to the obtained Default Paging DRX of the base station, in response to the NAS message during the UE registration not carrying the UE-specific paging DRX; and
  setting, by the core network, the Paging DRX parameter in the S1 Paging message to a smaller one of the Default Paging DRX and the UE-specific paging DRX obtained through comparison, in response to the NAS message during the UE registration carrying the UE-specific paging DRX.

* * * * *